US012578043B2

(12) United States Patent
Bongiorno et al.

(10) Patent No.: US 12,578,043 B2
(45) Date of Patent: Mar. 17, 2026

(54) TWO PIECE CLAMP HAVING TOOTHED ENGAGEMENT

(71) Applicant: Contour Biosolutions, LLC, Middlesex, NJ (US)

(72) Inventors: Louis Bongiorno, Millington, NJ (US); Andrew S. Mutz, Blackstone, MA (US)

(73) Assignee: Contour Biosolutions, LLC, Middlesex, NJ (US)

( * ) Notice: Subject to any disclaimer, the term of this patent is extended or adjusted under 35 U.S.C. 154(b) by 0 days.

(21) Appl. No.: 18/894,799

(22) Filed: Sep. 24, 2024

(65) Prior Publication Data

US 2025/0109812 A1 Apr. 3, 2025

Related U.S. Application Data

(60) Provisional application No. 63/587,501, filed on Oct. 3, 2023.

(51) Int. Cl.
*F16L 23/04* (2006.01)
*F16L 21/06* (2006.01)
*F16L 47/14* (2006.01)

(52) U.S. Cl.
CPC .............. *F16L 23/04* (2013.01); *F16L 21/06* (2013.01); *F16L 47/14* (2013.01)

(58) Field of Classification Search
CPC ........... F16L 23/04; F16L 21/06; F16L 47/14
See application file for complete search history.

(56) References Cited

U.S. PATENT DOCUMENTS

| | | | | |
|---|---|---|---|---|
| 3,229,998 | A | * | 1/1966 | Pennington |
| 3,709,526 | A | * | 1/1973 | Cromie .................. F16L 23/04 |
| 3,757,031 | A | * | 9/1973 | Izraeli |
| 4,260,181 | A | * | 4/1981 | Curtin |
| 6,516,498 | B2 | * | 2/2003 | LaCoy |
| 2012/0227221 | A1 | * | 9/2012 | Whitaker ................ F16L 23/04 |
| 2019/0128456 | A1 | * | 5/2019 | Aue ......................... F16L 23/04 |

FOREIGN PATENT DOCUMENTS

DE          10029366 A1 * 12/2001   .............. F16L 23/04

OTHER PUBLICATIONS

DE-10029366-A1—Machine Translation—English (Year: 2001).*

* cited by examiner

*Primary Examiner* — William S. Choi
(74) *Attorney, Agent, or Firm* — Sisson & Banyas, Attorneys at Law, LLC; Jeffrey J. Banyas

(57) ABSTRACT

A clamp may comprise a first clamp section and a second clamp section. Each clamp section may include a first semi-circular wall having first and second engagement members at opposing end points thereof. The first clamp section may be configured to connect to the second clamp section by engaging at least one tooth of a plurality of first teeth along a first tongue of one of the first clamp section engagement members to at least one tooth of a plurality of third teeth along a second channel of a second protrusion of one of the second clamp section engagement member while also engaging at least one tooth of a plurality of second teeth along a first channel of a first protrusion of the other first clamp section engagement member to at least one fourth tooth of a plurality of fourth teeth along a second tongue of the other second clamp section engagement member.

14 Claims, 8 Drawing Sheets

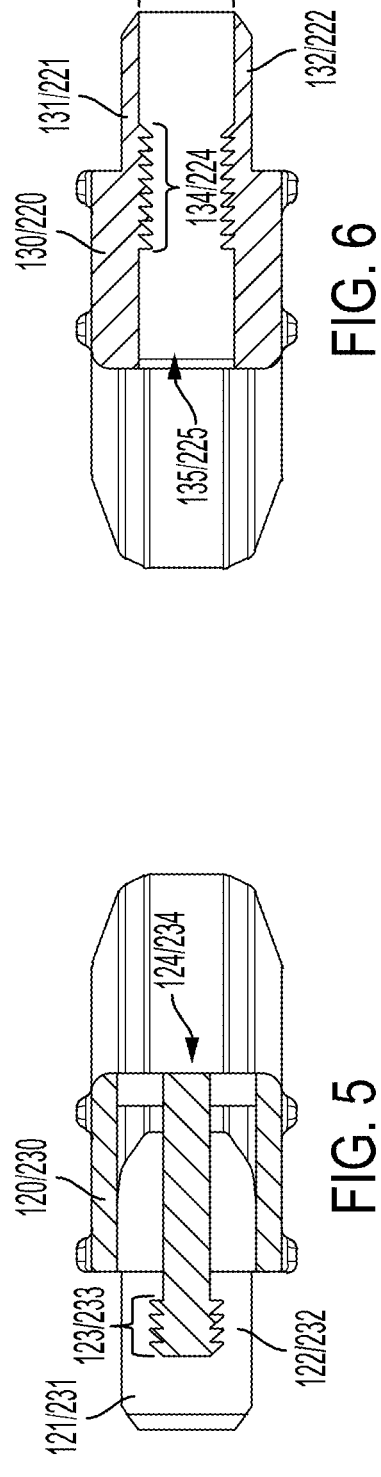
FIG. 5
FIG. 6
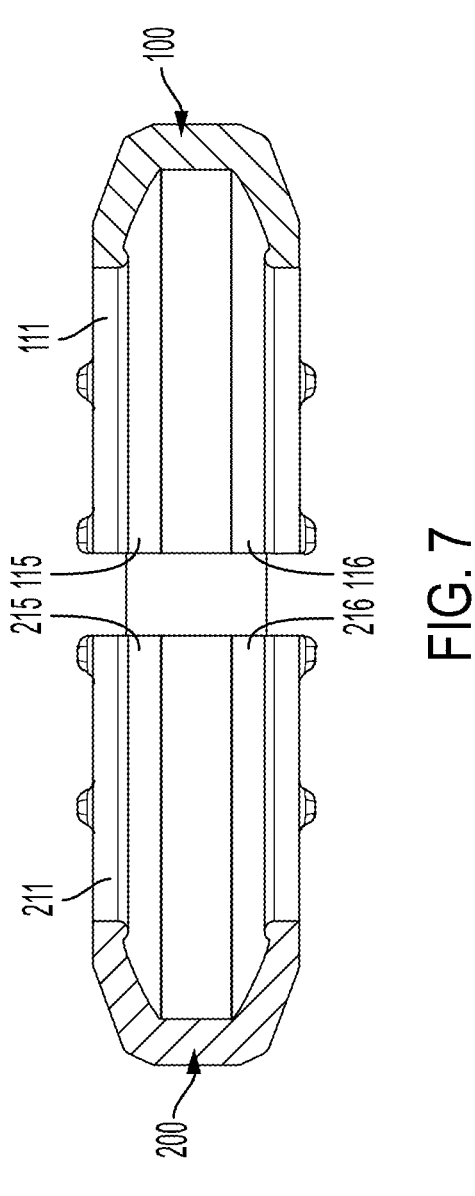
FIG. 7

TWO PIECE CLAMP HAVING TOOTHED ENGAGEMENT

CROSS REFERENCES AND PRIORITIES

This application claims priority from U.S. Provisional Application No. 63/587,501 filed on 3 Oct. 2023, the teachings of which are incorporated by reference herein in their entirety.

BACKGROUND

Chemical manufacturing, particularly pharmaceutical manufacturing, often requires aseptic sealing of the vessel within which the manufacturing process occurs and within the lines and conduits connected to said vessel. Aseptic sealing in such manufacturing typically requires the aseptic seal to withstand the pressures associated with the manufacturing process without leaking, breaking, or rupturing. Several clamps, valves, connectors, and other fasteners have been developed to provide aseptic sealing of chemical manufacturing equipment in pressurized environments.

Recently, many chemical manufacturing processes have transitioned to single-use processing equipment as opposed to reusable processing systems which require stringent sterilization regimes using harsh chemicals and high temperature steam after each use. Single-use systems conduct the entire duration of the production process in a single batch, utilizing processing equipment that is transported off-site for sterilization using gamma, EtO, or x-ray sterilization methods. These methods provide greater assurance of sterility at a lower cost than steam sterilizing multi-use metal systems. The requirement of replacing the entire process assembly creates a need for products that assemble quickly and accurately.

Single-use processing equipment—in which the various components are typically manufactured of a polymer material as opposed to metals found in reusable processing systems—suffers from several flaws when compared to reusable processing systems. Specifically, an entire processing system must be assembled for each production batch. This process is time consuming and labor intensive—often conducted by hand by several individuals operating in a clean-room environment. In addition, the multitude of conduits and connections involved in any one single-use system increases the chances that any one connection may be assembled without maintaining aseptic sealing and/or without maintaining sealing capable of withstanding manufacturing pressures when the system is in operation without leaking, breaking, or rupturing. Finally, the process of tying the various clamp sections together, particularly for transport to a sterilization site, can be time consuming and often fails.

The need exists, therefore, for improved equipment for assembling single-use aseptic pressurized chemical manufacturing systems which can be assembled quickly and easily by hand.

SUMMARY

Disclosed herein is a clamp comprising a first clamp section and a second clamp section. The first clamp section is configured to connect to the second clamp section.

The first clamp section has a first semi-circular wall, a first wall first engagement member, and a first wall second engagement member. The first semi-circular wall has a first inner surface, a first outer surface, a first wall first end point, and a first wall second end point. The first wall first engagement member is attached to the first outer surface at the first wall first end point and comprises a first tongue extending away from the first inner surface with the first tongue having a first tongue inner surface comprising a plurality of first teeth. The first wall second engagement member is attached to the first outer surface at the first wall second end point and comprises a first protrusion extending away from the first inner surface with the first protrusion having a first protrusion outer surface having a first channel comprising a plurality of second teeth.

The second clamp section has a second semi-circular wall, a second wall first engagement member, and a second wall second engagement member. The second semi-circular wall has a second inner surface, a second outer surface, a second wall first end point, and a second wall second end point. The second wall first engagement member is attached to the second outer surface at the second wall first end point and comprises a second protrusion extending away from the second inner surface with the second protrusion having a second protrusion outer surface having a second channel comprising a plurality of third teeth. The second wall second engagement member is attached to the second outer surface at the second wall second end point and comprises a second tongue extending away from the second inner surface with the second tongue having a second tongue inner surface comprising a plurality of fourth teeth.

The first clamp section is configured to connect to the second clamp section by engaging at least one tooth of the plurality of first teeth to at least one tooth of the plurality of third teeth, and engaging at least one tooth of the plurality of second teeth to at least one tooth of the plurality of fourth teeth.

In some embodiments, the first wall first engagement member may further comprise a first wall engagement member hole configured to receive at least a portion of the first protrusion when the first clamp section is connected to the second clamp section. The first wall engagement member hole may be a through hole.

In certain embodiments, the first wall second engagement member may further comprise a first wall second engagement member hole configured to receive at least a portion of the second tongue when the first clamp section is connected to the second clamp section. The first wall second engagement member hole may be a through hole.

In some embodiments, the second wall first engagement member may further comprise a second wall first engagement member hole configured to receive at least a portion of the first tongue when the first clamp section is connected to the second clamp section. The second wall first engagement member hole may be a through hole.

In certain embodiments, the second wall second engagement member may further comprise a second wall second engagement member hole configured to receive at least a portion of the second protrusion when the first clamp section is connected to the second clamp section. The second wall second engagement member hole may be a through hole.

In some embodiments, the plurality of first teeth may have an integral tooth dimension in a range of between 1.02 mm and 1.78 mm. The plurality of second teeth may have an integral tooth dimension in a range of between 1.02 mm and 1.78 mm. The plurality of third teeth may have an integral tooth dimension in a range of between 1.02 mm and 1.78 mm. The plurality of fourth teeth may have an integral tooth dimension in a range of between 1.02 mm and 1.78 mm.

In certain embodiments, the first semi-circular wall may have a first arc dimension of 180°. The second semi-circular wall may have a second arc dimension of 180°.

In some embodiments, the first semi-circular wall may include a first wall first clamping surface which is angled inwardly from the first inner surface towards the first outer surface. In such embodiments, the first semi-circular wall may also include a second clamping surface which is angled inwardly from the first inner surface towards the first outer surface.

In certain embodiments, the second semi-circular wall may include a second wall first clamping surface which is angled inwardly from the second inner surface towards the second outer surface. In such embodiments, the second semi-circular wall may include a second wall second clamping surface which is angled inwardly from the second inner surface towards the second outer surface.

In some embodiments, at least one of the first clamp section and/or the second clamp section may be comprised of a material selected from the group consisting of polyester, nylon, glass filled polyester, and glass filled nylon.

BRIEF DESCRIPTION OF FIGURES

FIG. 5 depicts a close-up radial cross section of an engagement member of a clamp.

FIG. 6 depicts a close-up radial cross section of an engagement member of a clamp.

FIG. 7 depicts an axial cross section of a segment of a clamp.

DETAILED DESCRIPTION

Disclosed herein is a clamp. The clamp is described below with reference to the Figures. As described herein, the following numbers refer to the following structures as noted in the Figures.

10 refers to a clamp.
100 refers to a first clamp section.
110 refers to a first semi-circular wall.
111 refers to a first inner surface.
112 refers to a first outer surface.
113 refers to a first wall first end point.
114 refers to a first wall second end point.
115 refers to a first wall first clamping surface.
116 refers to a first wall second clamping surface.
120 refers to a first wall first engagement member.
121 refers to a first tongue.
122 refers to a first tongue inner surface.
123 refers to first teeth.

124 refers to a first wall first engagement member hole.
130 refers to a first wall second engagement member.
131 refers to a first protrusion.
132 refers to a first protrusion outer surface.
133 refers to a first channel.
134 refers to second teeth.
135 refers to a first wall second engagement member hole.
140 refers to a third tongue.
141 refers to a third tongue inner surface.
142 refers to fifth teeth.
150 refers to a fourth tongue.
151 refers to a fourth tongue outer surface.
152 refers to sixth teeth.
200 refers to a second clamp section.
210 refers to a second semi-circular wall.
211 refers to a second inner surface.
212 refers to a second outer surface.
213 refers to a second wall first end point.
214 refers to a second wall second end point.
215 refers to a second wall first clamping surface.
216 refers to a second wall second clamping surface.
220 refers to a second wall first engagement member.
221 refers to a second protrusion.
222 refers to a second protrusion outer surface.
223 refers to a second channel.
224 refers to third teeth.
225 refers to a second wall first engagement member hole.
230 refers to a second wall second engagement member.
231 refers to a second tongue.
232 refers to a second tongue inner surface.
233 refers to fourth teeth.
234 refers to a second wall second engagement member hole.
240 refers to a fifth tongue.
241 refers to a fifth tongue outer surface.
242 refers to seventh teeth.
250 refers to a sixth tongue.
251 refers to a sixth tongue inner surface.
252 refers to eighth teeth.
300 refers to a first conduit section.
310 refers to a first terminal flange.
400 refers to a second conduit section.
410 refers to a second terminal flange.
501 refers to a first relief notch.
502 refers to a second relief notch.
503 refers to a third relief notch.
504 refers to a fourth relief notch.
505 refers to a fifth relief notch.
506 refers to a sixth relief notch.
507 refers to a seventh relief notch.
508 refers to an eighth relief notch.

Figure 2:
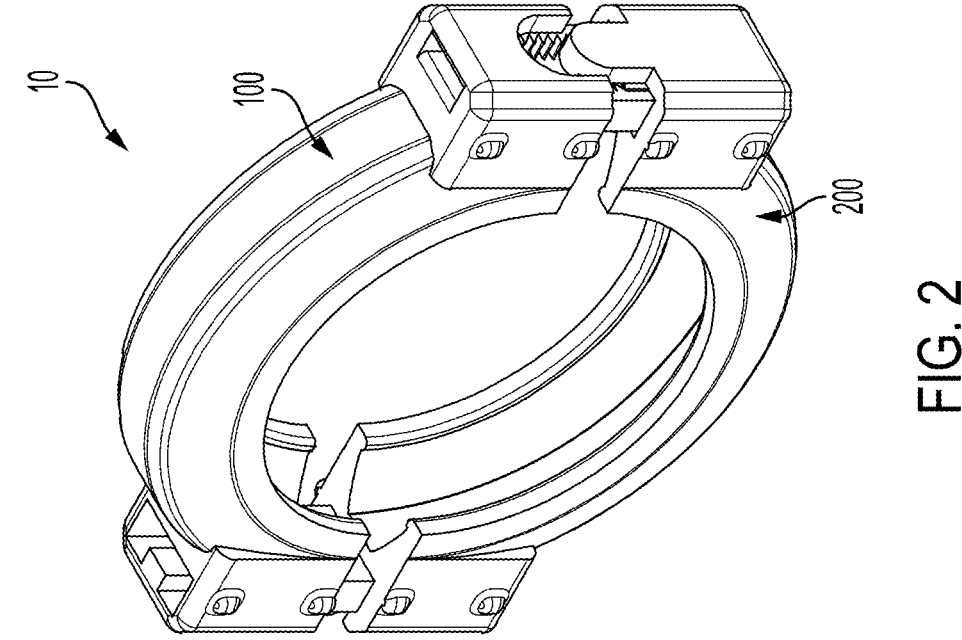
FIG. 2 depicts an assembled perspective view of the clamp of FIG. 1.
Figure 1:
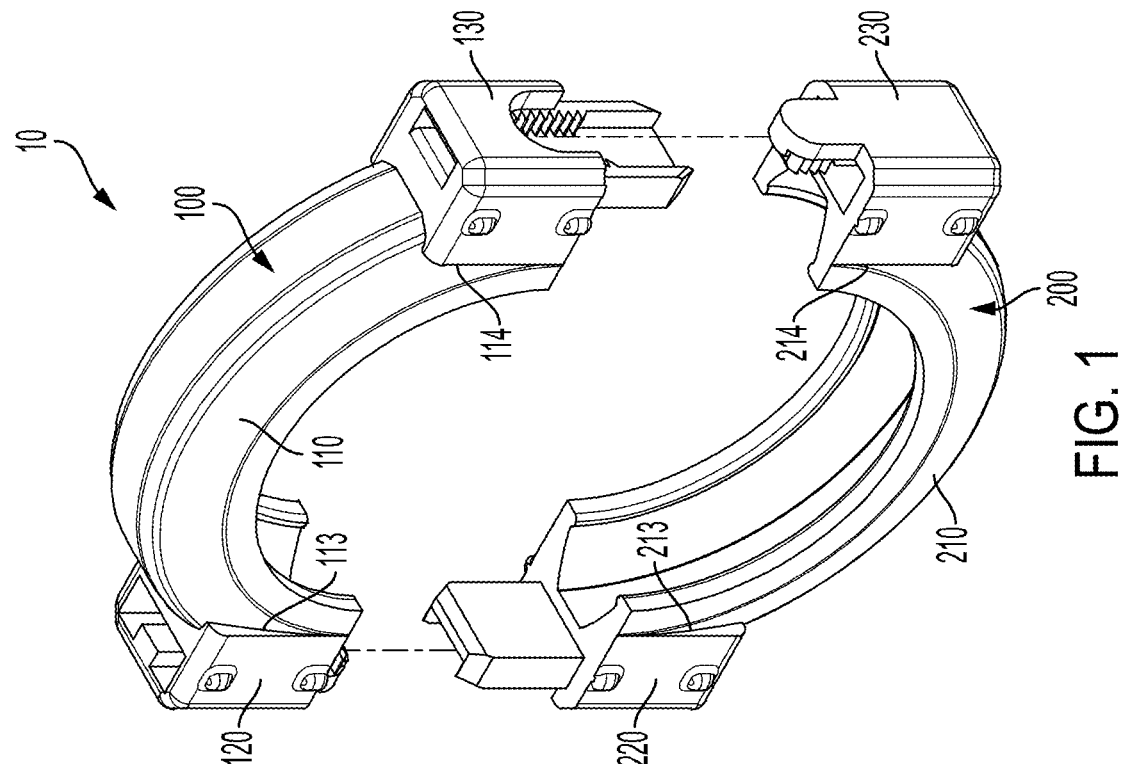
FIG. 1 depicts an exploded perspective view of a clamp.

FIG. 1 and FIG. 2 show exploded (FIG. 1) and assembled (FIG. 2) perspective views of a clamp (10). The clamp comprises a first clamp section (100) and a second clamp section (200).

As shown in FIG. 1, the first clamp section (100) has a first semi-circular wall (110) having a first wall first end point (113) and a first wall second end point (114). Attached to and extending from the first wall first end point is a first wall first engagement member (120). Similarly, attached to and extending from the first wall second end point is a first wall second engagement member (130).

The first semi-circular wall (110) may be considered an arc of a circle having an arc dimension. Preferably the arc dimension of the first semi-circular wall will be 180°, which also may be referred to as a half circle. Other embodiments may exist in which the arc dimension of the first semi-circular wall is in a range of between 90° and 270°. Preferably, the arc dimension of the first semi-circular wall in combination with the arc dimension of the second semi-circular wall described herein will equal 360° when the first clamp section (100) is mated to the second clamp section (200).

The second clamp section (200) may be of similar or even mirrored construction as that of the first clamp section (100). Accordingly, the second clamp section has a second semi-circular wall (210) having a second wall first end point (213) and a second wall second end point (214). Attached to and extending from the second wall first end point is a second wall first engagement member (220). Similarly, attached to and extending from the second wall second end point is a second wall second engagement member (230).

The second semi-circular wall (210) may be considered an arc of a circle having an arc dimension. Preferably the arc dimension of the second semi-circular wall will be 180°, which also may be referred to as a half circle. Other embodiments may exist in which the arc dimension of the first semi-circular wall is in a range of between 90° and 270°.

Figures 3, 4:
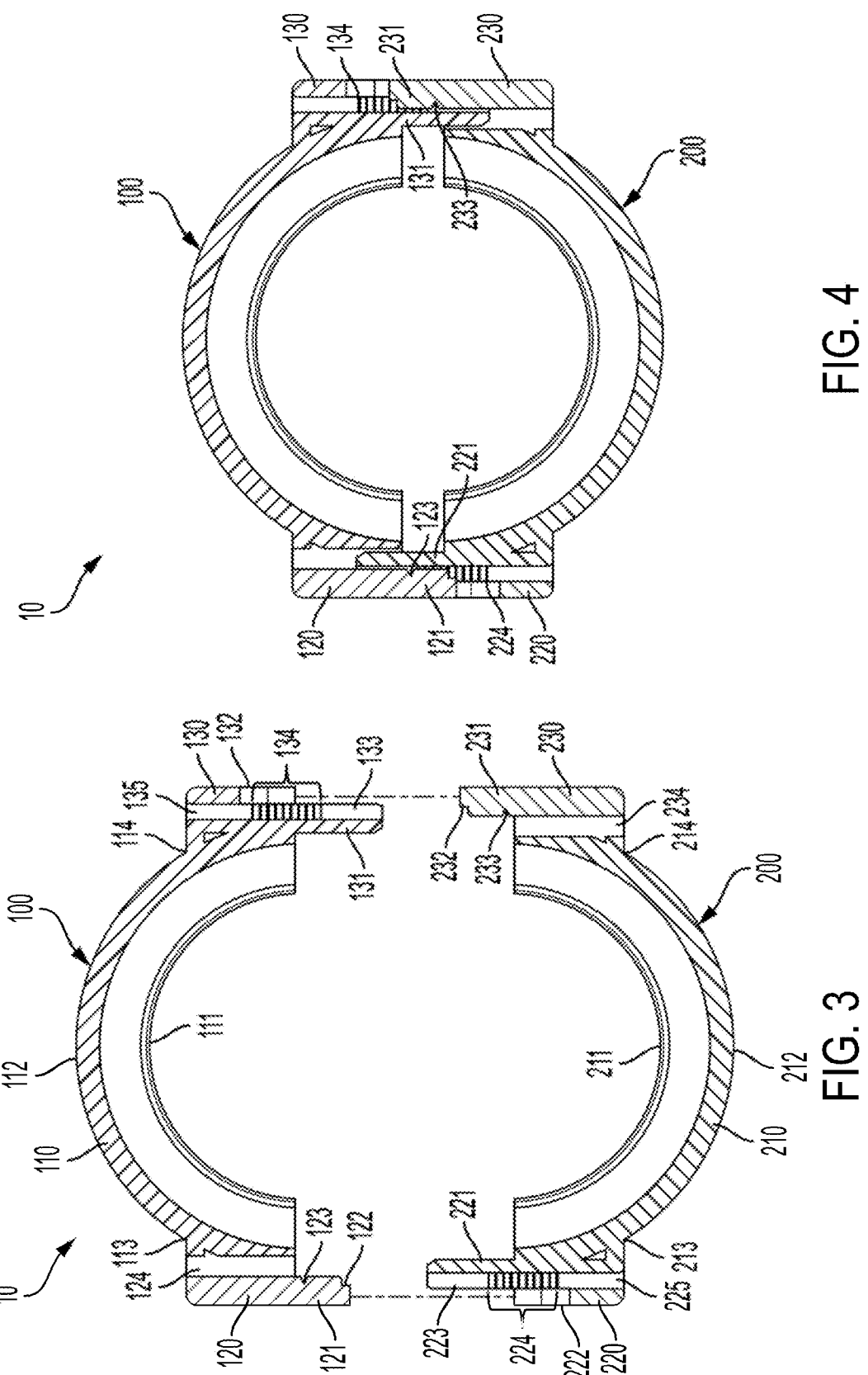
FIG. 3 depicts an exploded radial cross section of a clamp.
FIG. 4 depicts an assembled radial cross section of the clamp of FIG. 3.

FIG. 3 shows an exploded radial cross section of a clamp (10) illustrating further details. As shown, the first semi-circular wall (110) of the first clamp section (100) has a first inner surface (111) and a first outer surface (112). The first wall first engagement member (120) is attached to the first outer surface at the first wall first end point (113) as shown in FIG. 3. Similarly, the first wall second engagement member (130) is attached to the first outer surface at the first wall second end point (114) as shown in FIG. 3.

FIG. 3 also illustrates additional features of the first wall first engagement member (120). As shown, the first wall first engagement member may comprise a first tongue (121) extending away from the first inner surface (111). The first tongue may have a first tongue inner surface (122) comprising a plurality of first teeth (123).

Preferably, the first teeth (123) are fine teeth defined by having an integral tooth dimension of at least 1.02 mm and no greater than 1.78 mm. The integral tooth dimension of the first teeth may also be at least 1.14 mm, or at least 1.27 mm. The integral tooth dimension of the first teeth may also be no greater than 1.65 mm, no greater than 1.52 mm, or no greater than 1.40 mm. The integral tooth dimension may also be defined as a range selected from the group consisting of between 1.02 mm and 1.65 mm, between 1.02 mm and 1.52 mm, between 1.02 mm and 1.40 mm, between 1.14 mm and 1.78 mm, between 1.14 mm and 1.65 mm, between 1.14 mm and 1.52 mm, between 1.14 mm and 1.40 mm, between 1.27 mm and 1.78 mm, between 1.27 mm and 1.65 mm, between 1.27 mm and 1.52 mm, and between 1.27 mm and 1.40 mm.

Further shown in FIG. 3 are additional features of the first wall second engagement member (130). As shown, the first wall second engagement member may comprise a first protrusion (131) extending away from the first inner surface (111). The first protrusion may have a first protrusion outer surface (132) having a first channel ((133) as shown in FIG. 6) comprising a plurality of second teeth (134).

Preferably, the second teeth (134) are fine teeth defined by having an integral tooth dimension of at least 1.02 mm and no greater than 1.78 mm. The integral tooth dimension of the second teeth may also be at least 1.14 mm, or at least 1.27 mm. The integral tooth dimension of the second teeth may also be no greater than 1.65 mm, no greater than 1.52 mm, or no greater than 1.40 mm. The integral tooth dimension may also be defined as a range selected from the group consisting of between 1.02 mm and 1.65 mm, between 1.02 mm and 1.52 mm, between 1.02 mm and 1.40 mm, between 1.14 mm and 1.78 mm, between 1.14 mm and 1.65 mm, between 1.14 mm and 1.52 mm, between 1.14 mm and 1.40 mm, between 1.27 mm and 1.78 mm, between 1.27 mm and 1.65 mm, between 1.27 mm and 1.52 mm, and between 1.27 mm and 1.40 mm.

As shown in FIG. 3, the second semi-circular wall (210) of the second clamp section (200) has a second inner surface (211) and a second outer surface (212). The second wall first engagement member (220) is attached to the second outer surface at the second wall first end point (213) as shown in FIG. 3. Similarly, the second wall second engagement member (230) is attached to the second outer surface at the second wall second end point (214) as shown in FIG. 3.

Also illustrated in FIG. 3 are additional features of the second wall first engagement member (220). As shown, the second wall first engagement member may comprise a second protrusion (221) extending away from the second inner surface (211). The second protrusion may have a second protrusion outer surface (222) having a second channel ((223) as shown in FIG. 6) comprising a plurality of third teeth (224).

Preferably, the third teeth (224) are fine teeth defined by having an integral tooth dimension of at least 1.02 mm and no greater than 1.78 mm. The integral tooth dimension of the third teeth may also be at least 1.14 mm, or at least 1.27 mm. The integral tooth dimension of the third teeth may also be no greater than 1.65 mm, no greater than 1.52 mm, or no greater than 1.40 mm. The integral tooth dimension may also be defined as a range selected from the group consisting of between 1.02 mm and 1.65 mm, between 1.02 mm and 1.52 mm, between 1.02 mm and 1.40 mm, between 1.14 mm and 1.78 mm, between 1.14 mm and 1.65 mm, between 1.14 mm and 1.52 mm, between 1.14 mm and 1.40 mm, between 1.27 mm and 1.78 mm, between 1.27 mm and 1.65 mm, between 1.27 mm and 1.52 mm, and between 1.27 mm and 1.40 mm.

FIG. 3 further shows additional features of the second wall second engagement member (230). As shown, the second wall second engagement member may comprise a second tongue (231) extending away from the second inner surface (211). The second tongue may have a second tongue inner surface (232) comprising a plurality of fourth teeth (233).

Preferably, the fourth teeth (233) are fine teeth defined by having an integral tooth dimension of at least 1.02 mm and no greater than 1.78 mm. The integral tooth dimension of the fourth teeth may also be at least 1.14 mm, or at least 1.27 mm. The integral tooth dimension of the fourth teeth may also be no greater than 1.65 mm, no greater than 1.52 mm, or no greater than 1.40 mm. The integral tooth dimension may also be defined as a range selected from the group consisting of between 1.02 mm and 1.65 mm, between 1.02 mm and 1.52 mm, between 1.02 mm and 1.40 mm, between 1.14 mm and 1.78 mm, between 1.14 mm and 1.65 mm, between 1.14 mm and 1.52 mm, between 1.14 mm and 1.40 mm, between 1.27 mm and 1.78 mm, between 1.27 mm and 1.65 mm, between 1.27 mm and 1.52 mm, and between 1.27 mm and 1.40 mm.

FIG. 4 shows the radial cross-section view of the clamp (10) in assembled form. As shown in FIG. 4, the first clamp section (100) is configured to connect to the second clamp section (200) by engaging at least one tooth of the plurality of first teeth to at least one tooth of the plurality of third teeth. Simultaneously, at least one tooth of the plurality of second teeth is engaged to at least one tooth of the plurality of fourth teeth.

FIG. 5 shows a close-up radial cross-section of an engagement member comprising a tongue. As the first clamp section (100) and the second clamp section (200) may be similar or identical to one another, the engagement member shown in FIG. 5 may be considered either the first wall first engagement member (120) or the second wall second engagement member (230).

As shown in FIG. 5, the engagement member comprising a tongue (120/230) may comprise an engagement member hole which may be a first wall first engagement member hole (124) for the first clamp section (100) or a second wall second engagement member hole (234) for the second clamp section (200). This engagement member hole may be configured to receive at least a portion of the first protrusion or the second protrusion ((131/221) as shown in FIG. 6) when the first clamp section is connected to the second clamp section. In some embodiments, this engagement member hole may be a through hole allowing a user to insert a tool—such as the blade of a screwdriver—into the hole from the side opposite the tongue to disengage the first clamp section from the second clamp section.

FIG. 6 shows a close-up radial cross-section of an engagement member comprising a protrusion. As the first clamp section (100) and the second clamp section (200) may be similar or identical to one another, the engagement member shown in FIG. 6 may be considered either the first wall second engagement member (130) or the second wall first engagement member (220).

As shown in FIG. 6, the engagement member comprising a protrusion (130/220) may comprise an engagement member hole which may be a first wall second engagement member hole (135) for the first clamp section (100) or a second wall first engagement member hole (225) for the second clamp section (200). This engagement member hole may be configured to receive at least a portion of the first tongue or the second tongue ((121/231) as shown in FIG. 5) when the first clamp section is connected to the second clamp section. In some embodiments, this engagement member hole may be a through hole allowing a user to insert a tool—such as the blade of a screwdriver—into the hole from the side opposite the protrusion to disengage the first clamp section from the second clamp section.

FIG. 7 shows an axial cross section of a semi-circular wall of a clamp section. As the first clamp section (100) and the second clamp section (200) may be similar or identical to one another, the semi-circular wall shown in FIG. 7 may be considered either the first semi-circular wall (110) or the second semi-circular wall (210).

As shown in FIG. 7, the semi-circular wall(s) may include a first clamping surface (115/215) which is angled inwardly from the inner surface (111/211) towards the outer surface (112/212). The semi-circular wall(s) may also include a second clamping surface (116/216) which is angled inwardly from the inner surface towards the outer surface. As the clamp (10) is assembled about two adjoined sections of conduit—particularly sections of conduit having flanged terminal ends—the inwardly angled clamping surfaces force the flanged ends of the conduit closer to one another to achieve a tight, aseptic sealing between the two sections of conduit.

Figure 8:
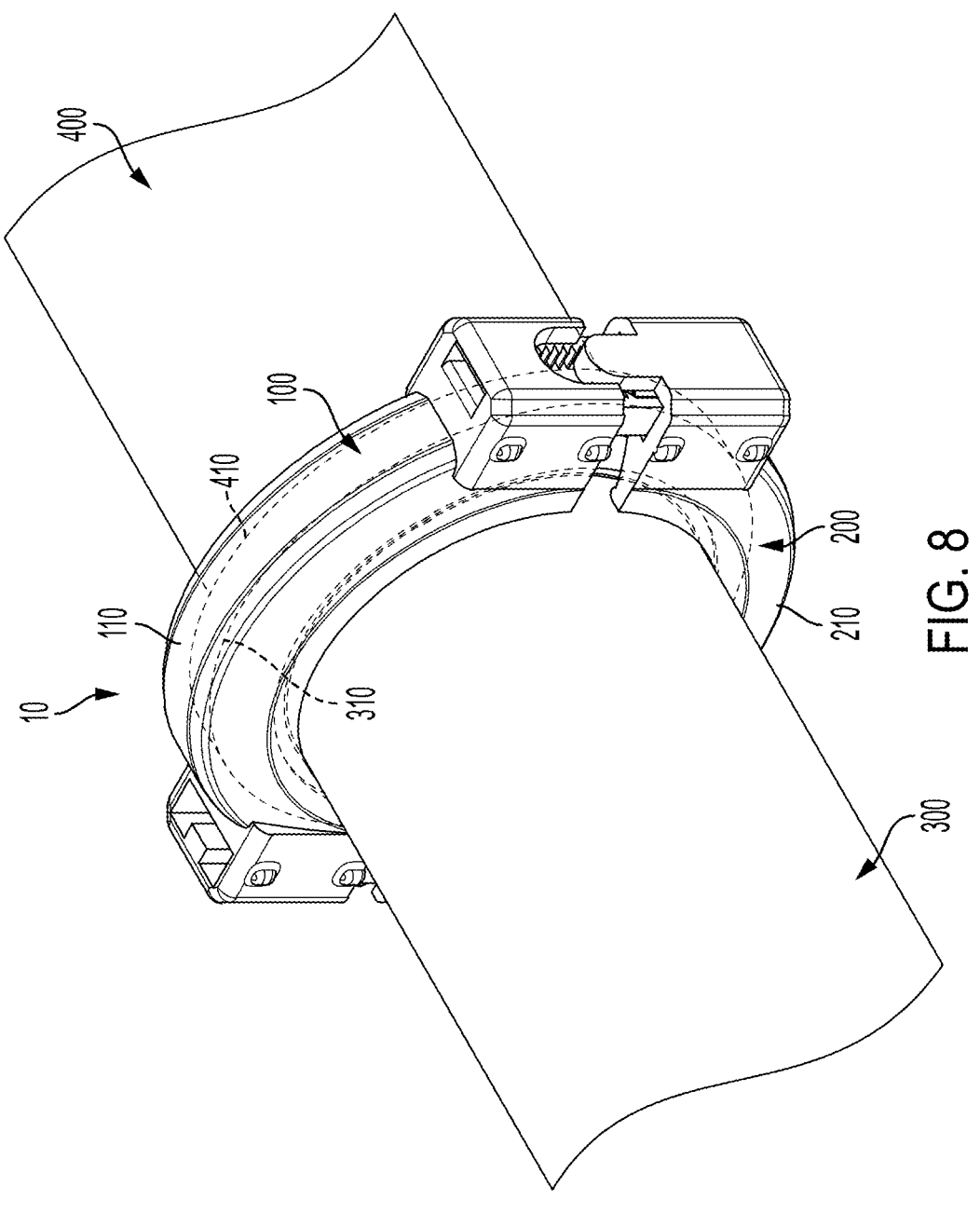
FIG. 8 depicts a clamp in use.
Figures 9, 10:
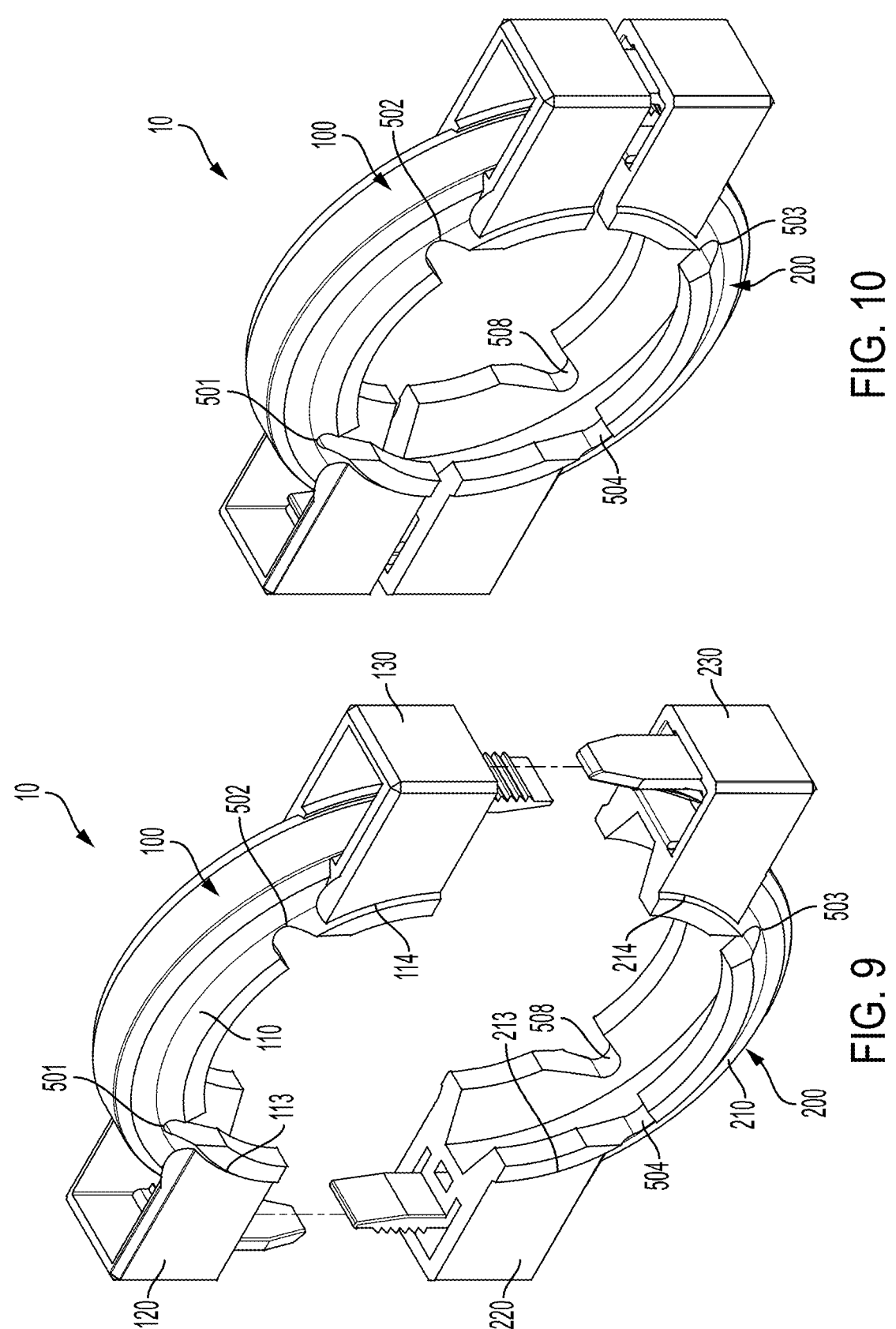
FIG. 9 depicts an exploded perspective view of a clamp.
FIG. 10 depicts an assembled perspective view of the clamp of FIG. 9.
Figures 11, 12:
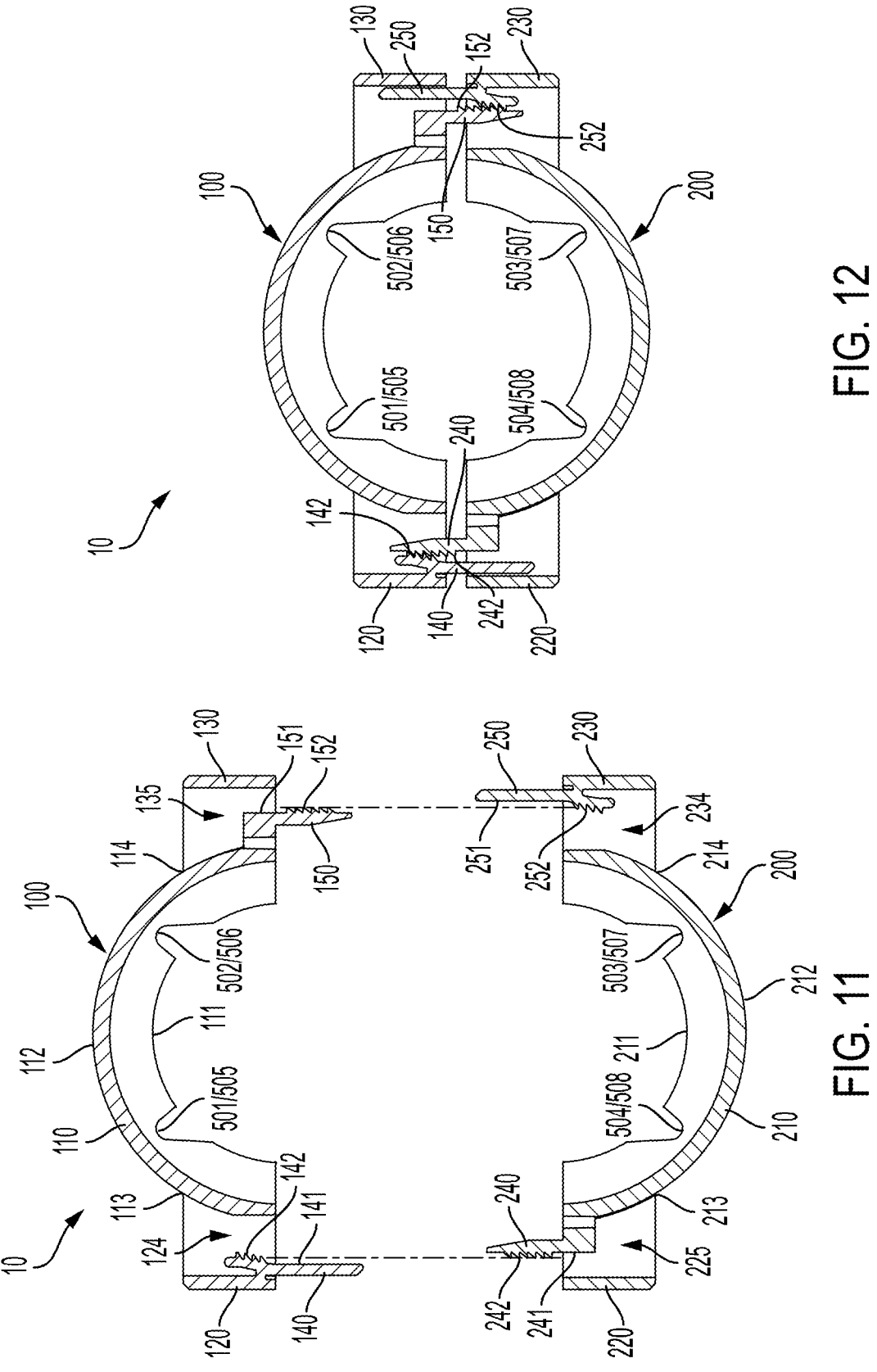
FIG. 11 depicts an exploded radial cross section of a clamp.
FIG. 12 depicts an assembled radial cross section of the clamp of FIG. 11.
Figure 13:
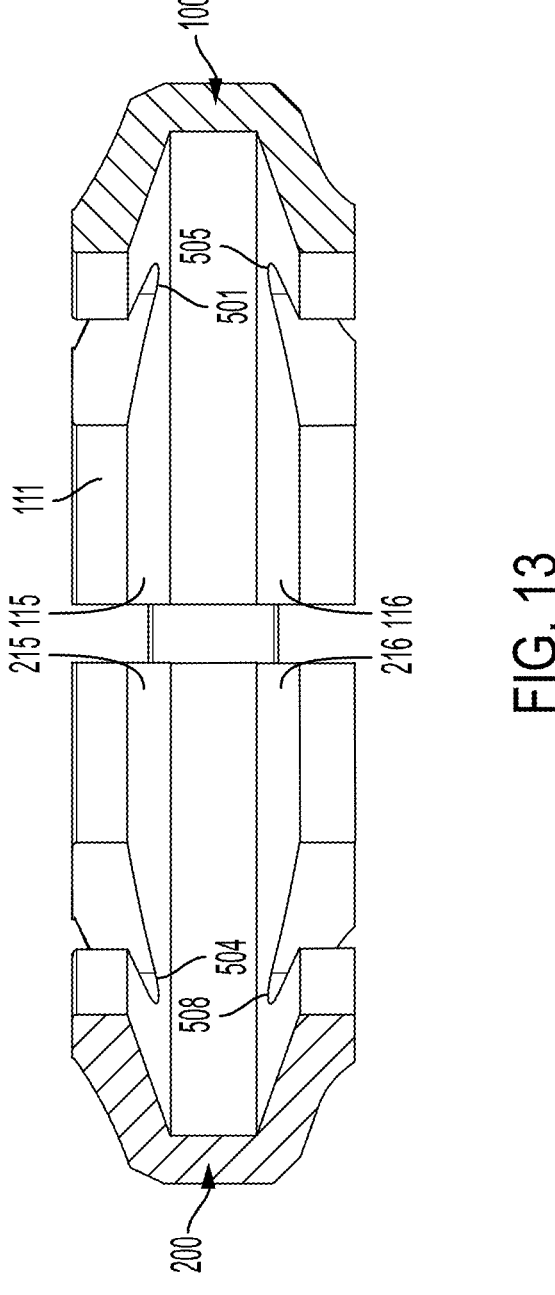
FIG. 13 depicts an axial cross section of a segment of a clamp.
Figure 14:
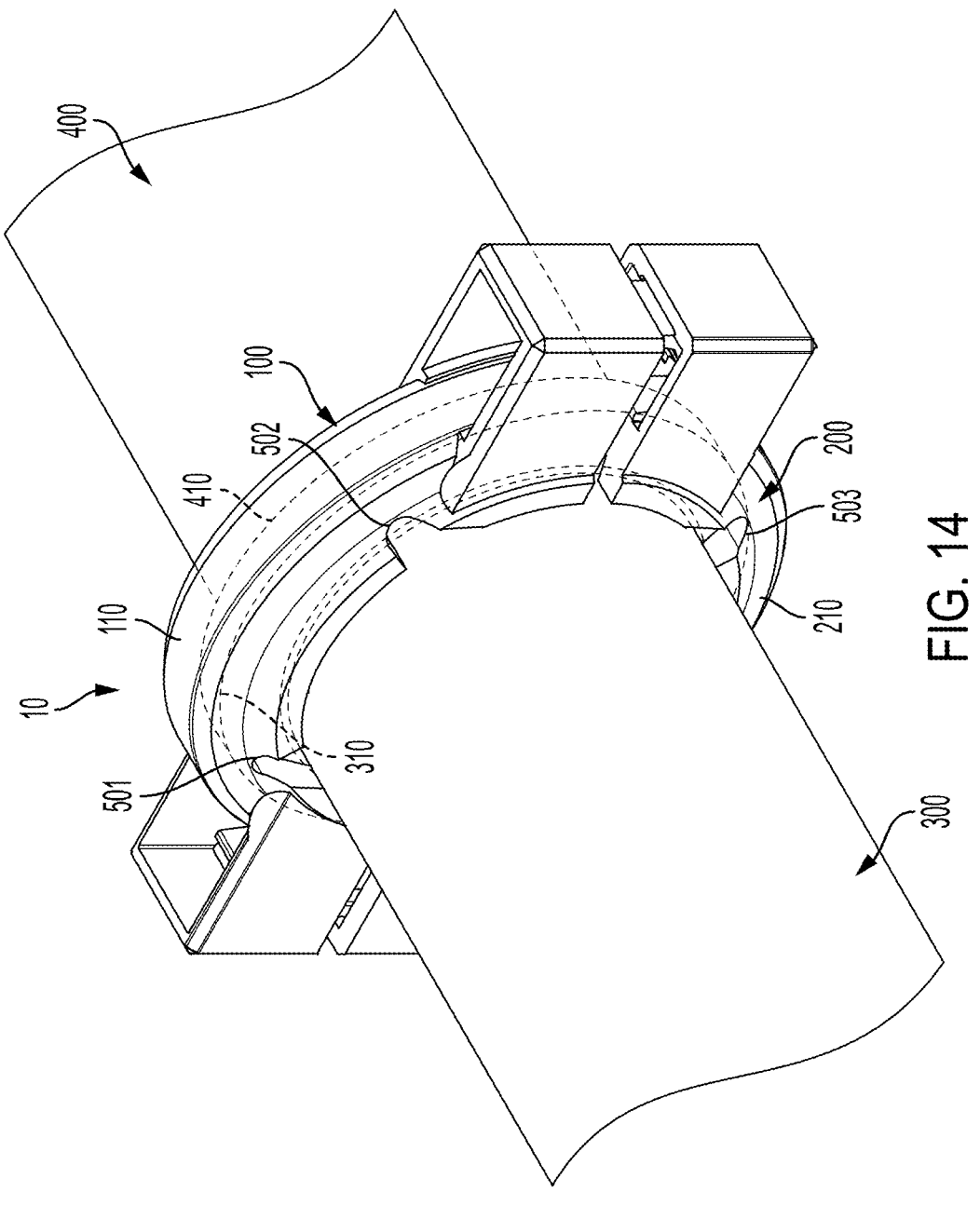
FIG. 14 depicts a clamp in use.

FIG. 8 shows a clamp (10) of the type disclosed herein in use to connect two sections of conduit to one another. As shown in FIG. 8, the first conduit section (300) may include a first terminal flange (310) while the second conduit section (400) may include a second terminal flange (410). The two clamp sections (100/200) assemble around the two conduit sections at the respective terminal flanges. In doing so, the angled clamping surfaces ((115/116/215/216) as shown in FIG. 7) of the two clamp sections force the two terminal flanges towards one another, providing a tight, aseptic sealing between the two sections of conduit.

Some embodiment of the clamp (10) may include one or more relief notches which allow for flexibility so that the clamp sections (100/200) may adapt to conduit sections, flanges, and the like having different sizes. One such embodiment is illustrated in FIGS. 9 through 14 which includes eight separate relief notches. A first relief notch (501) in the first semi-circular wall (110) proximate to the first wall first end point (113), a second relief notch (502) in the first semi-circular wall proximate to the first wall second end point (114), a third relief notch (503) in the second semi-circular wall (210) proximate to the second wall second end point (214), a fourth relief notch (504) in the second semi-circular wall proximate to the second wall first end point (213), a fifth relief notch (505) in the first semi-circular wall proximate to the first wall first end point and opposite the first relief notch, a sixth relief notch (506) in the first semi-circular wall proximate to the first wall second end point and opposite the second relief notch, a seventh relief notch (507) in the second semi-circular wall proximate to the second wall second end point and opposite the third relief notch, and an eighth relief notch (508) in the second semi-circular wall proximate to the second wall first end point and opposite the fourth relief notch. While FIGS. 9 through 14 illustrate eight relief notches, other embodiments exist. The number of relief notches in either the first clamp section (100) or the second clamp section (200) may each—independently—be an integer in a range of between 1 and 20.

The components of the clamps disclosed herein—including the first clamp section (100) and/or the second clamp section (200)—may be fabricated of any number of materials utilizing any number of manufacturing techniques. Non-limiting examples of such materials include polyesters, nylons, glass filled polyesters, glass filed nylons, and the like. Non-limiting examples of such manufacturing techniques include injection molding and additive manufacturing (often referred to as 3D printing). In injection molding manufacturing process, the two sections of the clamp can be manufactured using the same mold due to the fact that the two sections may be highly similar, if not identical, to one another.

The clamp disclosed herein with its fine teeth allows for assemblers to quickly and easily assemble single-use aseptic pressurized chemical manufacturing systems. The fine teeth ensure that the user can quickly snap or click the two clamp sections together to a position where they maintain aseptic sealing of conduit sections or other chemical manufacturing equipment. The fine teeth then prevent—or at least reduce the risk of—leaking, breaking, or rupturing as the teeth cannot be pulled apart or disengaged once assembled unless acted upon by an external tool such as the blade of a screw driver to physically pry the two clamp sections apart. The built-in, fine tooth locking mechanism also obviates both the need for ties such as cable ties to keep the clamp sections together, particularly during transport to sterilization and the need for such ties as tamper evidence.

While the tongue(s) shown in the drawings are straight and not curved or flexible, a tongue which curves away from or towards the opposite clamp section—and/or that is flexible—is also conceived. In this embodiment, the channel would be curved with the teeth following the channel. This embodiment increase the amount of tightness as the force required to move the tongue out of the channel is increased by the force required to navigate the curve. Additionally, the curved channel/curved tongue would also allow for a smaller side profile as the square extensions from the end points (113/114) could be eliminated as the tongue curves around the clamp.

While the clamps described herein may be assembled by hand, in some assembly processes it may be desirable to utilize a device such as a linear actuator to more accurately apply a specific force to the two clamp sections which may be desirable for maintaining connections in high pressure chemical manufacturing operations. One example of a linear actuator is a Micro Pen Actuator with Feedback available from Firgelli Automations of Ferndale, Washington, U.S.A.

While the clamp has been described as having one or more exemplary designs, the present clamp may be further modified within the spirit and scope of this disclosure. This application is therefore intended to cover any variations, uses, or adaptations of the clamp using its general principles.

What is claimed is:

1. A clamp comprising:
   a first clamp section having:
      a first semi-circular wall having a first inner surface, a first outer surface, a first wall first end point and a first wall second end point;
      a first wall first engagement member attached to the first outer surface at the first wall first end point, said first wall first engagement member comprising a first tongue extending away from the first inner surface, said first tongue having a first tongue inner surface comprising a plurality of first teeth; and
      a first wall second engagement member attached to the first outer surface at the first wall second end point, said first wall second engagement member comprising a first protrusion extending away from the first inner surface, said first protrusion having a first protrusion outer surface having a first channel comprising a plurality of second teeth; and
   a second clamp section having:
      a second semi-circular wall having a second inner surface, a second outer surface, a second wall first end point and a second wall second end point;
      a second wall first engagement member attached to the second outer surface at the second wall first end point, said second wall first engagement member comprising a second protrusion extending away from the second inner surface, said second protrusion having a second protrusion outer surface having a second channel comprising a plurality of third teeth; and
      a second wall second engagement member attached to the second outer surface at the second wall second end point, said second wall second engagement member comprising a second tongue extending away from the second inner surface, said second tongue having a second tongue inner surface comprising a plurality of fourth teeth; and
      wherein the first clamp section is configured to connect to the second clamp section by engaging at least one tooth of the plurality of first teeth to at least one tooth of the plurality of third teeth and engaging at least one tooth of the plurality of second teeth to at least one tooth of the plurality of fourth teeth;
      the first semi-circular wall includes a first wall first clamping surface which is angled inwardly from the first inner surface towards the first outer surface, and a first wall second clamping surface which is angled inwardly from the first inner surface towards the first outer surface; and
   the second semi-circular wall includes a second wall first clamping surface which is angled inwardly from the second inner surface towards the second outer surface, and a second wall second clamping surface which is angled inwardly from the second inner surface towards the second outer surface.

2. The clamp of claim 1, wherein at least one of the first clamp section and/or the second clamp section is comprised of a material selected from the group consisting of polyester, nylon, glass filed polyester, and glass filed nylon.

3. The clamp of claim 1, wherein the first wall first engagement member further comprises a first wall first engagement member hole configured to receive at least a portion of the second protrusion when the first clamp section is connected to the second clamp section, wherein said first wall first engagement member hole is a through hole.

4. The clamp of claim 1, wherein the first wall second engagement member further comprises a first wall second engagement member hole configured to receive at least a portion of the second tongue when the first clamp section is connected to the second clamp section, wherein said first wall second engagement member hole is a through hole.

5. The clamp of claim 1, wherein the second wall first engagement member further comprises a second wall first engagement member hole configured to receive at least a portion of the first tongue when the first clamp section is connected to the second clamp section, wherein said second wall first engagement member hole is a through hole.

6. The clamp of claim 1, wherein the second wall second engagement member further comprises a second wall second engagement member hole configured to receive at least a portion of the first protrusion when the first clamp section is connected to the second clamp section, wherein said second wall second engagement member hole is a through hole.

7. The clamp of claim 1, wherein the first semi-circular wall has a first arc dimension of 180°, and the second semi-circular wall has a second arc dimension of 180°.

8. A clamp comprising:
   a first clamp section having:
      a first semi-circular wall having a first inner surface, a first outer surface, a first wall first end point and a first wall second end point;
      a first wall first engagement member attached to the first outer surface at the first wall first end point, said first wall first engagement member comprising a third tongue extending away from the first inner surface, said third tongue having a third tongue inner surface comprising a plurality of fifth teeth; and
      a first wall second engagement member attached to the first outer surface at the first wall second end point, said first wall second engagement member comprising a fourth tongue extending away from the first inner surface, said fourth tongue having a fourth tongue outer surface comprising a plurality of sixth teeth; and
   a second clamp section having:
      a second semi-circular wall having a second inner surface, a second outer surface, a second wall first end point and a second wall second end point;
      a second wall first engagement member attached to the second outer surface at the second wall first end point, said second wall first engagement member comprising a fifth tongue extending away from the second inner surface, said fifth tongue having a fifth tongue outer surface comprising a plurality of seventh teeth; and a second wall second engagement member attached to the second outer surface at the second wall second end point, said second wall second engagement member comprising a sixth tongue extending away from the second inner surface, said sixth tongue having a sixth tongue inner surface comprising a plurality of eighth teeth; and wherein the first clamp section is configured to connect to the second clamp section by engaging at least one tooth of the plurality of fifth teeth to at least one tooth of the plurality of seventh teeth and engaging at least one tooth of the plurality of sixth teeth to at least one tooth of the plurality of eighth teeth;

the first semi-circular wall includes a first wall first clamping surface which is angled inwardly from the first inner surface towards the first outer surface, and a first wall second clamping surface which is angled inwardly from the first inner surface towards the first outer surface; and the second semi-circular wall includes a second wall first clamping surface which is angled inwardly from the second inner surface towards the second outer surface, and a second wall second clamping surface which is angled inwardly from the second inner surface towards the second outer surface.

9. The clamp of claim 8, wherein at least one of the first clamp section and/or the second clamp section is comprised of a material selected from the group consisting of polyester, nylon, glass filed polyester, and glass filed nylon.

10. The clamp of claim 8, wherein the first wall first engagement member further comprises a first wall first engagement member hole configured to receive at least a portion of the fifth protrusion when the first clamp section is connected to the second clamp section, wherein said first wall first engagement member hole is a through hole.

11. The clamp of claim 8, wherein the first wall second engagement member further comprises a first wall second engagement member hole configured to receive at least a portion of the fifth tongue when the first clamp section is connected to the second clamp section, wherein said first wall second engagement member hole is a through hole.

12. The clamp of claim 8, wherein the second wall first engagement member further comprises a second wall first engagement member hole configured to receive at least a portion of the sixth tongue when the first clamp section is connected to the second clamp section, wherein said second wall first engagement member hole is a through hole.

13. The clamp of claim 8, wherein the second wall second engagement member further comprises a second wall second engagement member hole configured to receive at least a portion of the fourth tongue when the first clamp section is connected to the second clamp section, wherein said second wall second engagement member hole is a through hole.

14. The clamp of claim 8, wherein the first semi-circular wall has a first arc dimension of 180°, and the second semi-circular wall has a second arc dimension of 180°.

* * * * *